United States Patent [19]

Allen

[11] 4,164,955

[45] Aug. 21, 1979

[54] LIQUID LEVEL CONTROL VALVE

[75] Inventor: Ronald N. Allen, Sevenoaks, England

[73] Assignee: Millars Wellpoint International Ltd., Bishops Stortford, England

[21] Appl. No.: 843,329

[22] Filed: Oct. 18, 1977

[30] Foreign Application Priority Data

Oct. 20, 1976 [GB] United Kingdom ............... 43496/76

[51] Int. Cl.² ............................................ F16K 31/26
[52] U.S. Cl. .................................... 137/202; 137/205; 137/450
[58] Field of Search ............... 137/205, 202, 196, 450, 137/DIG. 5; 251/282

[56] References Cited

U.S. PATENT DOCUMENTS

| 827,716 | 8/1906 | Eastwood | 137/DIG. 5 |
| 1,710,253 | 4/1929 | Bossard | 137/205 X |
| 2,955,611 | 10/1960 | Shimizu | 137/196 X |
| 3,096,068 | 7/1963 | Claridge | 137/450 X |
| 3,726,303 | 4/1973 | Allen | 137/205 |

*Primary Examiner*—Alan Cohan
*Attorney, Agent, or Firm*—Schwartz & Weinrieb

[57] ABSTRACT

A liquid level control valve, more particularly for use with air separation means and having a suction chamber communicating with a source of vacuum, is disclosed. A port in the wall of the suction chamber is opened and closed by a float-controlled valve which has the center of a flexible diaphragm fixely connected thereto and the periphery of the diaphragm sealingly engaged around the periphery of an aperture in the suction chamber, the arrangement providing a balanced action.

6 Claims, 2 Drawing Figures

//LIQUID LEVEL CONTROL VALVE

FIELD OF THE INVENTION

The present invention relates to a liquid level control valve, more particularly as used in combination with air separation means wherein the valve is positioned between the separation means and a vacuum source to prevent the passage of liquid to the latter.

OBJECTS OF THE INVENTION

An object of the invention is to provide a liquid level control valve of extremely simple construction which, in use, has a balanced action.

A further object of the invention is to provide a liquid level control valve which is capable of use in a wide variety of applications, thus reducing the stock holding of such valves.

SUMMARY OF THE INVENTION

The present invention consists of a liquid level control valve comprising a casing having a suction chamber formed therein for communication with a source of vacuum, a port formed in the wall of said chamber adapted to be opened and closed by a valve member, a flexible member fixedly connected to said valve member and sealingly engaged around its periphery with an aperture in said chamber to form therewith a flexible wall portion and a liquid level controlled float connected to said valve member to effect opening and closing movement thereof.

Preferably, the effective surface area of said flexible wall portion is greater than the cross-sectional area of said port.

It is to be understood that throughout the following description such terms as "top", "upper", "horizontal", or the like, are used for convenience to refer to the relative position of parts when the valve is in its normal position of use and such terms are not to be construed as limitative.

DETAILED DESCRIPTION OF THE ILLUSTRATED EMBODIMENT

Figures 1, 2:
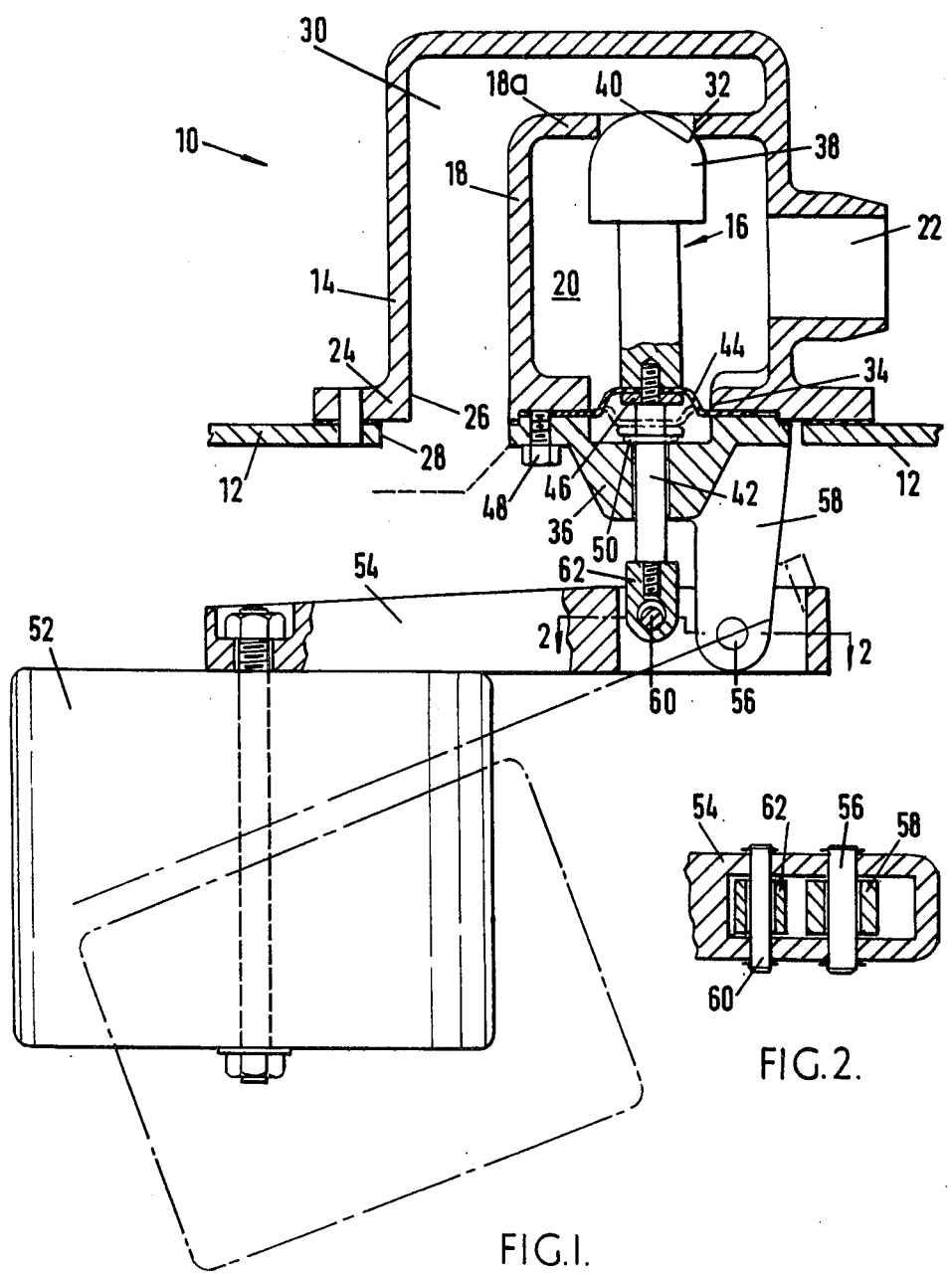
FIG. 1 is a cross-sectional view of a liquid level control valve according to the present invention.
FIG. 2 is a cross-section taken on the line 2—2 of FIG. 1.

In carrying the invention into effect according to one convenient mode, by way of example, a liquid level control valve 10 is positioned between an air separation tank having an upper wall 12 and communicating with a centrifugal liquid pump (not shown) and a vacuum pump (not shown) used for the removal of air from the tank. The control valve comprises a valve casing 14 adapted to be fixedly mounted on the upper horizontal wall 12 of the air separation tank and a valve member 16 reciprocably mounted in the casing 14.

The valve casing 14 has internal walls 18 and 18a forming a suction chamber 20 with a passageway 22 communicating with the vacuum pump. The lower horizontal wall 24 of the valve casing 14 has an aperture 26 formed therein coincident with an aperture 28 in the top wall 12 of the separation tank which communicates, through a passageway 30, with a port 32 formed in the upper, horizontal wall 18a of the suction chamber 20.

The lower wall 24 of the valve casing is also provided with another aperture 34 which is coaxial with the port 32 formed in its upper wall 18a and with an apertured, downwardly depending, spigotted boss 36.

The valve member 16, also coaxially disposed with respect to the port 32 and apertured boss 36 referred to above, has an enlarged head portion 38 provided with a hemi-spherical seating surface 40 which, under certain operational conditions, closes the port 32 leading to the suction chamber 20. The lower end of the valve member 16 has a stem 42 coaxially and screwthreadedly engaged therein which is slidably mounted in the aperture formed in the downwardly depending boss 36 on the lower wall 24 of the valve casing.

A diaphragm 44 is clamped at its centre between the lower end of the valve member 16 and a washer 46 providing an abutment member seated on the stem, and its outer periphery is clamped by bolts 48 between the facing surface of the lower casing wall 24 and boss 36 around the aperture 34 in wall 24. The effective surface area of the diaphragm 44, that is, the area subjected to the reduced pressure in the suction chamber 20, is preferably greater than the cross-sectional area of the valve port 32. An 'O'-ring 50 is positioned around the valve stem between the abutment member 46 and the boss 36 and a passageway (not shown) is provided through the boss to enable separator tank pressure to act on the underside of the diaphragm.

The valve member 16 is reciprocable in its casing under the action of a float 52 which rises and falls in the separating tank according to the level of the liquid therein. The float 52 is mounted adjacent one end of an arm 54, the other end of which is pivotally mounted by a spindle 56 on a support plate 58 depending downwardly from the boss 36 and the lower end of the valve stem 42 is also pivotally mounted, with clearance, by a spindle 60 and connector 62, adjacent the float arm spindle 56. It will be appreciated that, if desired, the float 52 can be directly mounted on the lower end of the valve stem 42.

During normal operation, with the liquid level low in the separation tank, the float 52 and valve member 16 are in their respective lowermost positions with the seating surface 40 of the valve head 38 unseated from its port 32 and the vacuum pump extracting air from the tank via the valve passageway 30, suction chamber 20 and its passageway 22.

If during operation, the liquid level in the tank rises, the float 52 also rises moving the valve member 16 upwardly via the float arm 54 and the valve stem 42 until the valve seating surface 40 engages the port 32 and so closes communication between the separation tank and the vacuum pump. It will be seen that a balance effect is obtained by use of the valve diaphragm 44 allowing equal loading on the valve 16 and diaphragm 44 and is in balance, which allows greater areas to be used with small nominal load effect.

Upon the water level being lowered again, the float 52 is also lowered and the valve member 16 is unseated so that the tank is again in communication with the vacuum pump. At the lowermost position the abutment member 46 on the valve stem 42 engages the 'O'-ring 50 to act as a cushion to reduce shock loads.

In the event of inadvertent removal of the float from its arm, the arrangement is "fail-safe" in that the diaphragm 44 is automatically flexed upwardly so that the valve 16 closes the valve port 32 due to the area ratios of the port 32 and the diaphragm 44.

It will be readily appreciated that any desired operational characteristic of the valve may be obtained merely by changing the effective surface area of the diaphragm relative to the cross-sectional area of the valve port which enables the valve assembly to be used in a wide variety of applications.

Obviously, many modifications and variations of the present invention are possible in light of the aforenoted teachings. It is to be understood therefore that within the scope of the appended claims, the present invention may be practiced otherwise than as specifically described herein.

I claim:

1. A liquid level control valve, utilized in combination with air separation means and positioned between said air separation means and a vacuum source for preventing the passage of liquid from said air separation means to said vacuum source, comprising:
    casing means for mounting upon said air separation means,
    a suction chamber formed in said casing means,
    a source of vacuum communicating with said suction chamber,
    a port, formed in the wall of said chamber, adapted to be opened and closed by means of a valve member, and providing fluidic communication between said air separation means and said suction chamber,
    a flexible member fixedly connected to said valve member and sealingly engaged around its periphery with an aperture defined in a wall of said chamber so as to facilitate the definition of a flexible wall portion of said member, the effective surface area of said flexible wall portion of said flexible member being greater than the cross-sectional area of said port so as to bias said flexible wall portion of said flexible member, and said valve member connected thereto, toward said closed port position, and
    a liquid level controlled float connected to said valve member for effecting opening and closing movements thereof in response to the liquid level within said air separation means so as to permit the withdrawal of air from said air separation means to said vacuum source when said valve member is opened, and to prevent the passage of liquid from said air separation means to said vacuum source when said valve member is closed.

2. A valve as claimed in claim 1, wherein said port is formed in the upper wall of the suction chamber and said valve member is mounted for vertical reciprocatory movement relative thereto.

3. A valve as claimed in claim 2, wherein the lower end of the valve member has a stem coaxially and fixedly connected thereto which is slidably mounted in an aperture formed in a downwardly depending boss.

4. A valve as claimed in claim 3, wherein the centre of said flexible member is clamped between the lower end of said valve member and an abutment member on said stem, and the periphery of said flexible member is clamped between a lower wall of the valve casing and the upper surface of the downwardly depending boss.

5. A valve as claimed in claim 4, wherein an 'O'-ring is positioned around the valve stem between said abutment member and the upper surface of the downwardly depending boss.

6. A valve as claimed in claim 3, wherein the float is mounted on an arm pivotally mounted on the downwardly depending boss, the lower end of said valve stem being pivotally connected to said arm.

* * * * *